US006077568A

United States Patent [19]

Ford et al.

[11] Patent Number: 6,077,568

[45] Date of Patent: Jun. 20, 2000

[54] METHOD OF COATING ELONGATE OBJECTS

[75] Inventors: David Ford, Maidenhead; David Walton Tyson Tee, Keswick; Stewart Ely, Penrith, all of United Kingdom

[73] Assignee: Acco-Rexel Group Services Plc., Middlesex, United Kingdom

[21] Appl. No.: 08/942,925

[22] Filed: Oct. 2, 1997

[30] Foreign Application Priority Data

Oct. 4, 1996 [GB] United Kingdom .................. 9620760

[51] Int. Cl.[7] ....................................... C08J 7/04

[52] U.S. Cl. .......................... 427/512; 427/558; 427/559; 427/595; 427/385.5; 427/177

[58] Field of Search ............................ 427/512, 558, 427/559, 595, 385.5, 177

[56] References Cited

U.S. PATENT DOCUMENTS 4,589,367 5/1986 Renegar et al. .
4,668,536 5/1987 Goodell et al. .
4,744,329 5/1988 Jeanmonod .

FOREIGN PATENT DOCUMENTS 0 161 540 11/1985 European Pat. Off. .
0 168 105 1/1986 European Pat. Off. .
2 583 150 12/1986 France .
53-017 425 2/1978 Japan .
61-293572 12/1986 Japan .
5-139086 6/1993 Japan .
452250 8/1936 United Kingdom .
654178 6/1951 United Kingdom .
WO 84/04705 12/1984 WIPO .
WO 96 34700 7/1996 WIPO .

*Primary Examiner*—Bernard Pianalto
*Attorney, Agent, or Firm*—Pearne, Gordon, McCoy & Granger LLP

[57] ABSTRACT

Paint or varnish is applied to the exterior of elongate elements such as pencils, by passing the pencils(3) through a receptacle(12) containing the paint or varnish(13), causing the pencils(3) to leave the receptacle(12) through a washer (17) which permits the pencils to leave the receptacle with a coating of paint or varnish on the exterior thereof, and subsequently passing the pencils through a light box(23) adapted to apply light to each point on the exterior of each pencil(3), the paint or varnish(13) comprising a resin which has the property that curing of the resin is initiated in response to the application of the light.

7 Claims, 4 Drawing Sheets

METHOD OF COATING ELONGATE OBJECTS

The present invention relates to an apparatus for and a method of coating elongate objects.

The invention will be described with particular reference to the coating of pencils with varnish or paint, but it is to be understood that the invention may be used with any other form of elongate object which needs to be coated or painted.

Pencils and other similar items, such as crayons, are most frequently varnished or painted. It is common for the varnishing or painting process to be carried out using an appropriate machine. A typical machine comprises a hopper which contains a large number of pencils. The width of the hopper is substantially equal to the length of the pencils, and the pencils are located in the hopper with the axes of the pencils extending across the width of the hopper. The hopper has inclining sides which lead to a channel at the base of the hopper dimensioned to receive just one pencil.

A drive rod is provided which is inserted into the hopper and which moves with a reciprocating movement along the channel. The extent of the movement is greater than the length of a pencil. The rod forces successive pencils out of an exit port provided at the end of the channel. The pencils effectively form a substantially endless horizontal stream of pencils in axial alignment.

With the aid of drive rollers or the like, the pencils pass through a fixed tank which contains paint or varnish. The pencils enter the tank through a gasket in one side wall and leave through an adjustable rubber washer in the opposite side wall. The gasket serves to prevent any paint leaving the tank. The adjustable rubber washer permits the pencils to leave the tank with a coating of paint along the barrel of each pencil. A screw mechanism may be provided which can be adjusted to control the degree of force exerted against the pencils by the rubber washer, thus adjusting the thickness of the paint.

The varnished or painted pencils are passed to a first conveyor belt where the varnish or paint undergoes an initial drying step. Typically, the varnish or paint utilises a volatile organic material as a solvent, such as acetone. During the initial drying step the acetone flashes off the varnish or paint coating. Subsequently, the pencils are passed to a second conveyor belt where the pencils are allowed to dry more thoroughly for a period of up to 50 minutes. At the end of this procedure, the paint or varnish is totally dried. The pencils may then be passed through the machine again for the application of a further coat of paint or varnish.

In some of the prior machines the hopper defines two channels, each with an associated drive rod, and the tank has two gaskets and two adjustable rubber washers so that two streams of pencils pass through the tank simultaneously.

The prior arrangement, as described above, has various disadvantages.

One major disadvantage is that a substantial amount of organic solvent, such as acetone, is given off. Organic solvents are pollutants that damage the environment. In many countries of the world legislation now exists which at least discourages the use of industrial processes where organic solvents, such as acetone, are given off into the environment.

A further disadvantage is that a relatively large number of coats of paint or varnish have to be applied to the pencil. After the pencil has received its first coat of paint or varnish, when it is subsequently passed again through the tank of paint or varnish, at least part of the initial layer is stripped off by the action of the solvent present in the tank. Thus, for a desired degree of finish, a large number of coats of paint have to be applied. The time for each coat of paint or varnish to be applied and subsequently dried is quite long, typically up to 50 minutes, and if fifteen or more coats have to be applied, a single batch of pencils may occupy a machine for over twelve hours.

The machine that carries out the varnishing or painting and the drying occupies a substantial amount of floor space.

The present invention seeks to provide an improved apparatus for, and method of, coating an elongate object such as a pencil.

According to one aspect of the invention there is provided a method of applying paint or varnish to the exterior of elongate elements having two ends and an exterior, the elongate elements being of uniform length, the method comprising the steps of passing the elongate elements horizontally sequentially through a receptacle containing paint or varnish, causing the elongate elements to leave the receptacle through a washer which permits the elongate elements to leave the receptacle with a coating of paint or varnish on the exterior of each of the elongate elements, and immediately passing the elongate elements through means adapted to illuminate each point on the exterior of each elongate element with ultra violet light, the paint or varnish comprising a resin which has the property that curing of the resin is initiated in response to the application of said ultra-violet light.

Advantageously the illuminating means have a width less than the length of an elongate element.

Conveniently a plurality of elongate elements are introduced to the receptacle and to the illuminating means as a substantially endless horizontal stream of axially aligned elements, the method comprising the step of withdrawing the elements from the illuminating means at a speed greater than the speed at which the elements are introduced to the receptacle.

Preferably the elements are withdrawn from the illuminating means by drive means which engage the leading end of each element before the trailing end of the element has entered the illuminating means.

Advantageously the drive means engage the leading end of each element when the trailing end of the element is within the washer, and the leading end of the next element is also in the washer.

Conveniently the subsequent step of causing each elongate element to roll down a ramp whilst being illuminated with light to facilitate completion of the curing of said resin.

Another aspect of the present invention provides an apparatus for coating with paint or varnish the exterior of a plurality of elongate elements, each elongate element having an exterior and two ends, the elongate elements being of uniform length, the apparatus comprising a receptacle for paint or varnish, the receptacle having first sealing means in one side wall and second sealing means in an opposed side wall, means being provided for introducing the elongate elements horizontally sequentially through the first sealing means, causing the elongate elements to pass across the receptacle and to leave the receptacle through the second sealing means, the second sealing means being adapted to permit the elongate elements to leave the receptacle with a coat of said paint or varnish on the exterior of each of the elongate elements, means to illuminate every point on the exterior of each coated elongate element with ultra-violet light and means to transport the elongate elements away from the illuminating means.

Preferably the illuminating means have a width less than the length of the elongate element.

Conveniently the transport means are adapted to withdraw the elements sequentially from the illuminating means at a speed greater than the speed at which the elements are introduced to the receptacle.

Advantageously the transport means comprise a conveyor belt and an associated driven nip roller.

Preferably the transport means are located to engage the leading end of an element before the trailing end of the element enters the illuminating means.

Conveniently the transport means are located to engage the leading end of an element while the trailing end is located in the second sealing means and when the leading end of the next succeeding element is also located in the second sealing means.

Advantageously the illuminating means comprises a light box comprising two housings, each housing containing an ultra-violet lamp, each lamp being of elongate form and being located substantially at the focus of a parabolic mirror, the parabolic mirrors being adapted to direct light in two oppositely directed, substantially parallel beams.

Preferably the light box is mounted on an arm for pivotal movement between an operative position, in which the light box is positioned to receive the elongate element leaving the receptacle, and an inoperative position where the light box is positioned to be accessible for maintenance.

Conveniently one housing is rigidly mounted on said arm and the other housing is pivotally mounted for pivotal movement relative to said one housing.

Advantageously means are provided to supply cooling compressed air to said illuminating means.

Preferably each lamp has electrodes at each end thereof, means being provided to direct compressed air towards the exterior surface of each lamp in the region of the electrodes.

Conveniently the illuminating means is provided with means to supply cooling water and means to withdraw cooling water, there being cooling water channels within the illuminating means.

Advantageously said transport means are associated with a sloping ramp and means to direct light on to said ramp, the arrangement being such that, in use, elongate elements are transported from said illuminating means, to said ramp and the elongate elements roll down the ramp whilst being illuminated with light.

In order that the invention may be more readily understood, and so that further features thereof may be appreciated, the invention will now be described, by way of example, with reference to the accompanying drawings in which:

Figure 1:
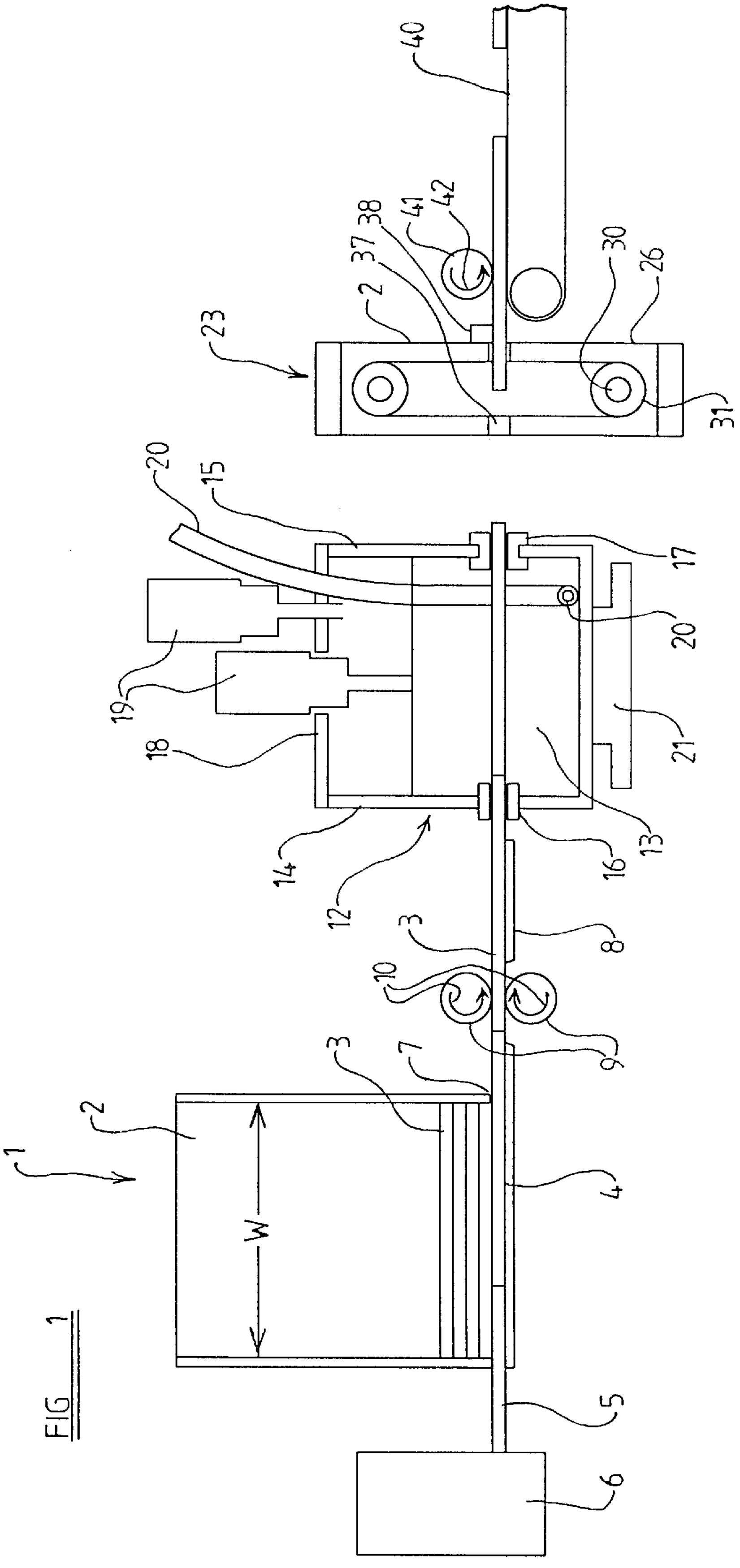
FIG. 1 is a sectional view of an apparatus in accordance with the invention.
Figure 2:
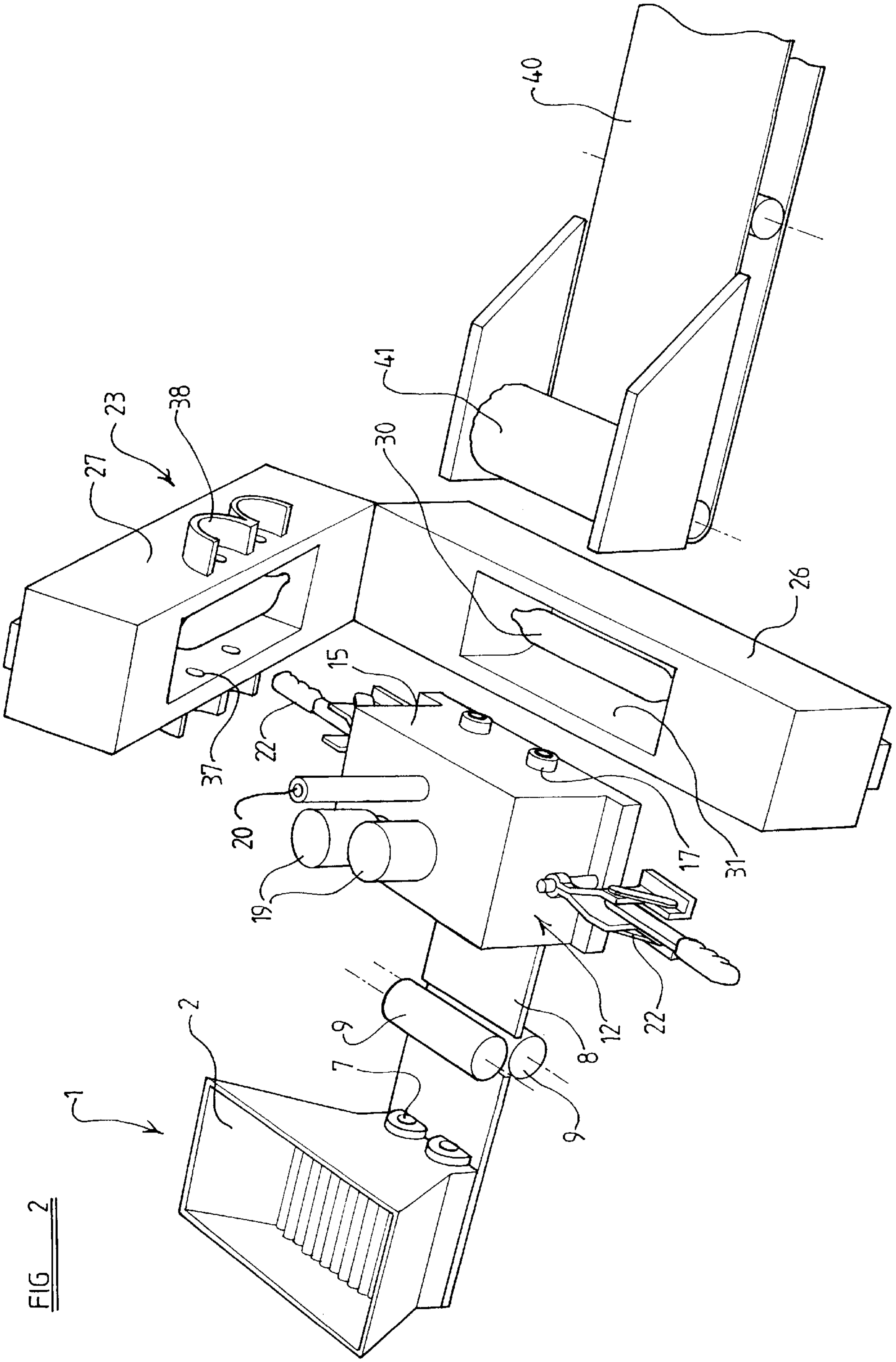
FIG. 2 is a perspective view of part of the apparatus in accordance with the invention.

Referring now to the drawings, an apparatus for coating elongate objects, such as pencils, comprises a hopper 1. The hopper has converging side walls 2 and has a width W which is substantially equal to the length of a pencil 3. A typical pencil has a length of 180 mm (7 inches) and thus the width W is selected to be slightly greater than this length. The hopper contains a supply of pencils 3. Each pencil has its longitudinal axis extending horizontally across the width of the hopper. The lower part of the hopper defines a groove or channel 4 dimensioned to receive one pencil 3. A drive rod 5 is provided which is associated with a reciprocating mechanism 6. The mechanism 6 causes the rod 5 to move axially with a horizontal reciprocating movement. The drive rod 5 enters the hopper 1 from one side in alignment with the groove 4. The hopper defines an exit port 7 on the other side, in alignment with the groove 4.

On operation of the reciprocating mechanism, the drive rod 5 is driven in and out of the hopper 1 with a reciprocating movement. The length of the movement is greater than the length of a pencil 3. The drive rod 5, thus pushes successive pencils 3 out of the port 7 with a horizontal movement.

A guide platform 8 is provided which is aligned with the groove 4, and drive wheels 9 are provided located between the hopper 3 and the guide platform 8. Means are provided to rotate the drive wheels 9 as indicated by the arrow 10. The drive wheels 9 nip successive pencils 3 to drive them horizontally across the support platform 8.

In the preferred embodiment, the hopper defines two parallel and spaced apart channels 4 in the base of the hopper and there are respective reciprocating drive rods 5 and respective drive wheels 9 associated with each channel 4. Consequently, two parallel horizontal streams of axially aligned pencils are created on operation of the device as thus far described. The described apparatus may easily be modified to allow a greater number of streams of pencils to be created and coated simultaneously.

A receptacle 12 for paint or varnish 13 is provided. The receptacle has two opposed side walls 14,15. The side wall 14 has two apertures therein each provided with first sealing means in the form of a grommet 16. The side wall 15 has two apertures therein, each associated with a second sealing means in the form of a rubber washer 17 and an associated screw mechanism which can adjust the internal diameter of the washer. The pairs of apertures are aligned with the two horizontal parallel streams of pencils.

The receptacle 12 is provided with a lid 18. The lid 18 carries level sensors 19 adapted to sense the level of paint or varnish 13 within the receptacle, and also is provided with an inlet conduit 20 for the supply of further paint or varnish to the receptacle. Paint or varnish will be supplied through the conduit by a supply arrangement in response to signals from the sensors 19. The conduit 20 extends to the bottom of the receptacle on the interior of the receptacle.

The receptacle 12 is releasably mounted on a support 21 and is held in position by means of manually releasable clamps 22 which engage flanges that are formed integrally with the receptacle 12.

Consequently, it is to be appreciated that the pencils may move, as two substantially endless horizontal streams, through the receptacle 12, passing through grommets 16 and the rubber washers 17. The pencils emerge through the rubber washers 17 with a coating of the paint or varnish contained within the receptacle 12. The thickness of the coating is determined by the internal diameter of the washer as adjusted by the screw mechanism.

The paint or varnish 13 contained within the receptacle is a paint or varnish that does not incorporate any volatile organic solvent. Instead, the paint or varnish is a curable resin of the type in which curing is initiated by ultra-violet light. Ultra-violet light is light having a wavelength of between 150 and 550 nm. Many different types of ultra-violet curable resins, paints and varnishes have been proposed before, typically formed from unsaturated polyester resins or acrylic resins, in association with a photosensitiser, or photo-initiator. The skilled man will be able to select a varnish or paint suitable for use with the invention from the varnishes or paints already available.

Adjacent the side of the receptacle 12 remote from the hopper 3, aligned with the washers 17, is a light box 23. The streams of pencils leaving the receptacle 12 are adapted to pass through the light box 23. The light box 23 is provided with light sources which illuminate the entire exterior or outer surface of each pencil as it passes through the light box with a light that initiates the curing of the resin. The resin will be cured and will be touch-dry within a very short period of time, typically a small fraction of a second.

Figure 3:
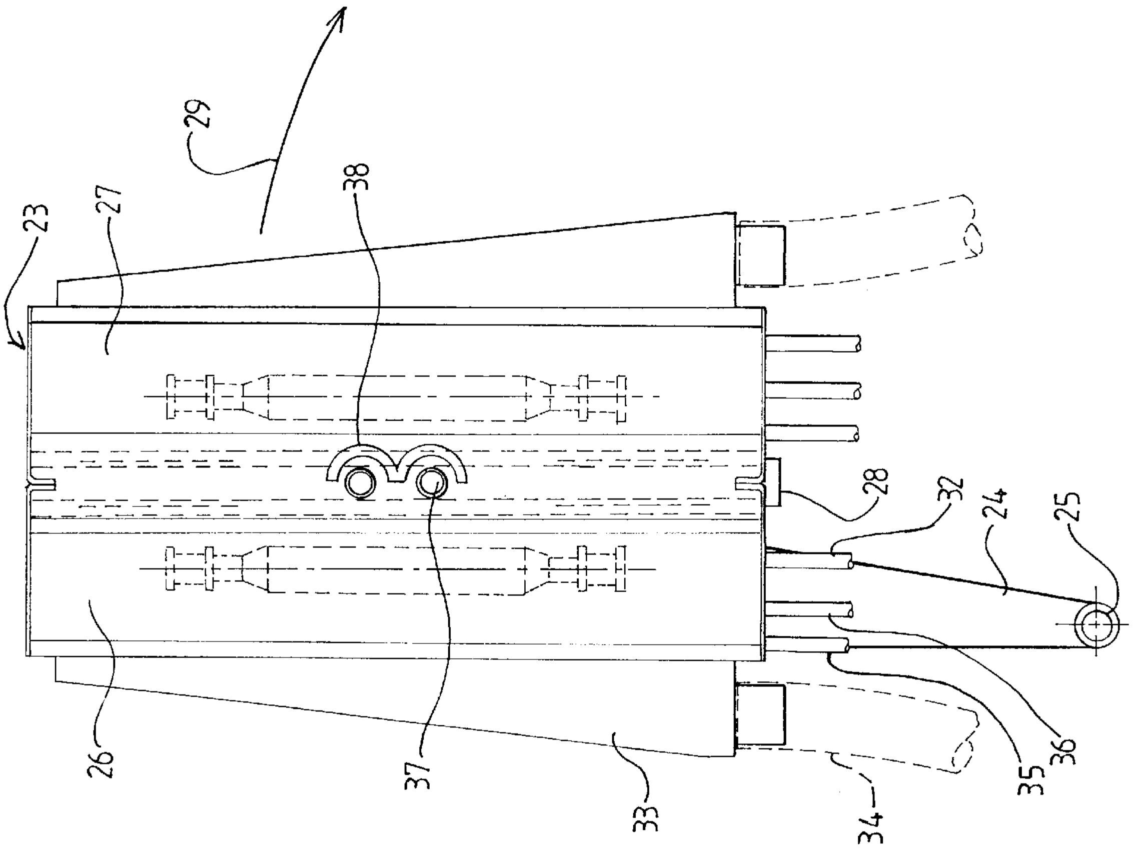
FIG. 3 is a view illustrating the illuminating means of the apparatus of FIG. 1 in an alternative position.

As can be seen more clearly from FIG. 3, the light box 23 comprises an assembly which is mounted on a support arm 24, the support arm 24 being adapted to pivot about a support axis 25. The light box assembly 23 may be pivoted from a vertical position as shown in FIG. 3, in which the light box has been moved away from the receptacle 12, to a position as illustrated in FIG. 1 in which the light box is in alignment with the receptacle 12.

The light box 23 comprises two housings 26,27. The housing 26 is securely mounted on the support arm 24, whereas the housing 27 is pivotally connected to the housing 26 by means of a pivotal connection 28. It is thus to be appreciated that the light box may initially be pivoted from the operative position as shown in FIG. 1 to an elevated position as shown in FIG. 3 and subsequently, the housing 27 may be moved pivotally relative to the housing 26, as indicated by the arrow 29 thus providing access to the interior of the light box to facilitate maintenance.

The housings 26 and 27 are each of essentially the same design and thus only one housing will now be described.

Contained within the housing 26 is an elongate light source 30 in the form of an ultra-violet emitting lamp. A typical lamp for this purpose has a substantial content with wavelengths in the range 200 to 500 nm. The lamp 30 is an elongate lamp with electrodes at the opposed ends thereof and is mounted at the focal point of a hyperbolic mirror or reflector 31 as can be seen most clearly in FIG. 1. The hyperbolic reflector is adapted to generate a substantially parallel beam of rays directed towards the path to be followed by the pencils 3 as they pass through the light box.

The two housings thus generate oppositely directed parallel beams that illuminate every point on the exterior of each of the pencils as they pass horizontally through the light box. Thus, the curing of the point or varnish that covers each pencil is initiated at every point on the exterior of the pencil.

The lamps 30 may be mounted so that they can quickly be removed and replaced. This gives a minimum time for replacing a malfunctioning lamp. Also, if UV light of a different wavelength is needed for a different paint or varnish, appropriate lamps can be installed rapidly.

As can be seen most clearly in FIG. 3, the housing 26 is provided with a compressed air inlet 28. The compressed air inlet is connected to appropriate compressed air ducts which direct compressed air at those parts of the lamp 30 which, in operation of the lamp, run at an elevated temperature. These areas of the elongate lamp 30 comprise the opposed ends where electrodes are provided within the lamp. The compressed air provides a cooling effect. The compressed air flows through the interior of the housing and leaves the housing through an exhaust duct 33 provided on the exterior of the housing.

Exhaust air entering the exhaust duct 33 will have entrained with it any gaseous products emanating from the resin as it cures. Some light curing resins emanate, for example, small quantities of ozone. Any such ozone will be entrained within the air stream flowing within the light box, and will be entrained with the exhaust air leaving through the exhaust duct 33. The exhaust duct 33 may be connected to an exhaust conduit 34, which may be associated with an evacuation pump, and which will lead to a suitable discharge point where the exhaust air is discharged into the atmosphere.

The housing 26 is also provided with a cooling water inlet 35 and a cooling water outlet 36. Cooling water is caused to flow through the inlet 35, around cooling ducts provided within the housing, and through the water outlet 36. The cooling effect provided by the compressed air and by the water is such that the lamps operate at a desired temperature, which is relatively high, but without over-heating. The air and the water absorb the heat generated by the lamps so that the described apparatus does not provide a substantial waste heat output into the environment it operates.

The housings 26,27 define paths 37 that extend through the light box to enable the streams of pencils to pass through the light box.

Each path 37 is associated with a light shield 38 which projects from each side of the light box above the light path to prevent light from the light box being inadvertently directed towards the eyes of personnel operating the described apparatus.

As can be seen more clearly from FIG. 1 and 3, when the two housings 26 and 27 have been pivoted together to form the light box 23 and the light box 23 has been pivoted about the pivot axis 25 to be in the operational position, the paths 37 through the light box, through which the pencils 3 leaving the receptacle 12 may pass, are aligned with the rubber washers 17.

The width of the light box is substantially less than the length of a pencil.

A conveyor 40 is provided in alignment with the light box 23 and a drive roller 41 is provided located above the conveyor and adapted to be driven as illustrated by the arrow 42. The conveyor and drive roller are so located that the leading end of a pencil that has passed horizontally through the light box 23 engages the conveyor 40 and is subsequently nipped by the periphery of the drive roller 41 so that the pencil is thus conveyed at a speed dictated by the speed of movement of the drive roller 41. This speed of movement is selected to be faster than the speed of movement of the stream of pencils through the receptacle 12. Typically, the speed is of 25 to 45 meters per second.

It is to be understood that the distance between the washers 17 and the associated rollers 41, is just less than the length of the pencil. Consequently the leading end of a pencil will be gripped by the drive roller 41 at an instant when the trailing edge of the pencil is still within the rubber washer 17 and, most preferably, at an instant when the leading end of the next pencil is already present within the rubber washer 17. Thus, as the leading pencil is accelerated by the action of the drive roller 41, the trailing end of the leading pencil 41 becomes separated from the leading end of the following pencil. Thus, as the trailing end of each pencil passes through the light box the trailing end is spaced from the leading end of the next following pencil, and there is no curable coating extending between the two pencils that can cure to link the pencils together.

Because the following pencil is already partly inserted into the rubber washer 17 before the leading pencil is accelerated by the action of the roller 41, there is only a very minimal risk of any of the paint or varnish present within receptacle 12 inadvertently escaping through the rubber washer 17.

It is to be understood that the curing action effected by the ultra-violet light applied to the coating composition is substantially instantaneous, meaning that at the instant when the roller 41 engages the leading end of a pencil, the paint or varnish present on the exterior of the pencil, in that region, is substantially cured and the drive roller does not, in any way, damage or impair the cured coating. As the pencil progresses under the drive roller, each point on the pencil that is engaged by the drive roller will be covered by a coating that is substantially cured, since the coating will, at that instant, have already passed completely through the light box 23. Thus the roller 41 serves to accelerate a leading pencil to separate it from a following pencil at an instant when the coating provided at the leading end of the pencil has already been substantially cured, and at an instant when the trailing end of the pencil is still within the rubber washer provided on the tank 12. It is to be understood that this can only be achieved by using a light box having a width which is less than the length of a single pencil.

Sensors may be provided to sense that the machine is operating correctly. Such sensors may sense pencils in the hopper, paint or varnish in the receptacle, and the movement of pencils along the conveyor. The apparatus may be stopped if a malfunction is sensed.

Figure 4:
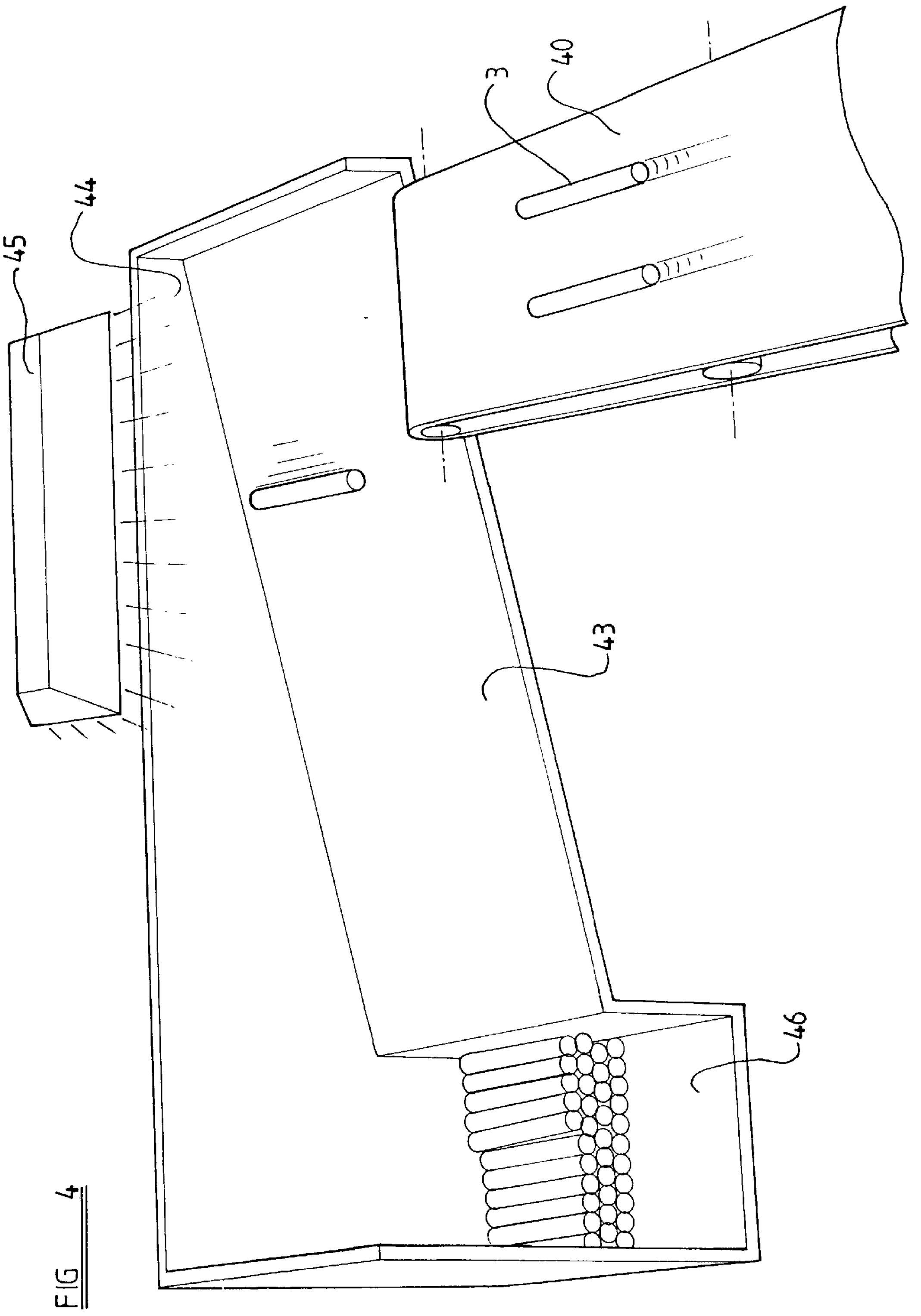
FIG. 4 is a perspective view of a further part of the apparatus in accordance with the invention.

Whist it has been found that the coating of paint or varnish may be cured very rapidly, being touch-dry in a fraction of a second, it may be desired to effect a subsequent additional curing or hardening of the coating of paint or varnish. As illustrated in FIG. 4, the pencils 3, transported by the conveyor 40 away from the light box 23, may be discharged from the conveyor 40 on to a transversely sloping ramp 43. The ramp 43 is associated with a rear upstanding wall 44 which ensures that the pencils cannot over-shoot the sloping ramp.

Located above the sloping ramp is a light source 43 which directs light down on to the ramp. At the lower end of the ramp is a hopper 46, where pencils that have rolled down the ramp accumulate.

It will be appreciated that when a pencil 3 has been discharged from the conveyor 40 on to the ramp 43, the pencil 3 will cease its axial movement before or when the end of the pencil impinges on the upstanding wall 44. Under the influence of gravity, the pencil will then roll down the part of the ramp that is illuminated by the light source 45. As the pencil rolls, every point on the exterior of the pencil will be illuminated with the light from the light source 45. The light source 45 may be a source of ultra-violet light or may be a source of some other light necessary to complete the curing or hardening of the painting or varnish on the exterior of the pencil 3. If the light source 45 is an ultra-violet light source, the light source would be shielded in an appropriate manner from the eyes of operatives of the apparatus. Thus, for example, the end of the conveyor 40, and the ramp 43 may be located within a light-masking housing.

It is to be appreciated that if the paint or varnish is of a ‘clear’ type, which permits the wood-grain of the barrel of the pencil to be viewed after the varnish has cured, the curing of the varnish may be effected using ultra-violet light of a single appropriate wavelength. However, if a paint is utilised which incorporates a pigment, it may be appropriate to use one or more different wavelengths to fully cure the paint, because of the light-absorbing effect of the pigment. Indeed, if pigments of different colours are utilised it may be appropriate to use ultraviolet light sources of different wavelengths for each of the different pigments.

It may be appropriate, therefore, to change the nature of the bulbs 30 within the light box 26 in dependence upon the nature of the paint being utilised and it may be appropriate to use one type of bulb, providing one type of light, within the light box 26 and to use lamps providing a different type of light in the light source 45.

In utilising the invention it has been found that a pencil may be provided with a single coating of an ultra-violet curable varnish or paint, with the resultant coating having the same quality as a coating comprising fourteen or more separate layers of conventional solvent-based paint. Consequently, an apparatus carrying out the method of the invention generally as described above presents substantial advantages as compared with prior proposed arrangements. The apparatus of the invention occupies a very small amount of space, since there is no need for long conveyer belts to convey pencils whilst they are drying. As has been explained above the pencils are touch dry by the time they reach the nip roller 41 and even if they do need an additional curing step, as described in reference to FIG. 4, the apparatus as illustrated in FIG. 4 may be located only a very short distance from the light box 26. The apparatus achieves a desired coating with a single pass of a pencil through the apparatus. The entire process, even if the ramp 43 and light source 45 are used, is completed in a matter of a few seconds. Consequently, a single machine can provide coated pencils at a much faster rate than a single prior-proposed machine, where a pencil had to pass through the machine typically fourteen or more times to provide an adequate coating, with each pass taking up to 50 minutes.

It may be desired, for various reasons, to provide a pencil provided with a varnish or paint coating in accordance with the invention with a second or outer coating. For example a pencil may be initially painted with an opaque paint provided with pigment and may then be provided with an outer coating of a transparent varnish or lacquer. Because the paint or varnish used in the method described above is not a solvent-based resin, but instead is a cured paint or varnish, if the pencil is subsequently passed through the receptacle of paint or varnish for the application of a further coat of paint or varnish, none of the initially applied coat of paint or varnish is washed away by solvent action.

Because, in the method described above, no solvent is utilised in the paint or varnish, there is no risk of polluting the atmosphere with solvent.

When the method of the invention is performed as described above the pencils are maintained in a horizontal orientation throughout the entire process. Pencils may easily be transported in an orderly manner in “bundles” in the horizontal orientation. The pencils may be maintained in alignment and are subsequently easy to handle. If pencils inadvertently become misaligned it is a difficult and time consuming task to re-align them.

While the invention has been described with specific reference to pencils, the invention may be used to coat other elongate objects.

We claim:

1. A method of applying paint or varnish to the exterior of elongate elements having two ends and an exterior, the elongate elements being of uniform length, the method comprising the steps of introducing the elongate elements with a predetermined speed horizontally sequentially into a receptacle containing paint or varnish, causing the elongate elements to leave the receptacle at a speed greater than the predetermined speed through a washer which permits the elongate elements to leave the receptacle with a coating of paint or varnish on the exterior of each of the elongate elements, and immediately passing the elongate elements through means adapted to illuminate each point on the exterior of each elongate element with ultra violet light, the paint or varnish comprising a resin which has the property that curing of the resin is initiated in response to the application of said ultra-violet light.

2. A method according to claim 1, wherein the illuminating means have a width less than the length of an elongate element.

3. A method according to claim 1 wherein a plurality of elongate elements are introduced to the receptacle and to the illuminating means as a substantially endless horizontal stream of axially aligned elements, the method comprising the step of withdrawing the elements from the illuminating means at a speed greater than the speed at which the elements are introduced to the receptacle.

4. A method according to claim 3 wherein the elements are withdrawn from the illuminating means by drive means which engage the leading end of each element before the trailing end of the element has entered the illuminating means.

5. A method according to claim 4 wherein the drive means engage the leading end of each element when the trailing end of the element is within the washer, and the leading end of the next element is also in the washer.

6. A method according to claim 1 comprising the subsequent step of causing each elongate element to roll down a ramp whilst being illuminated with light to facilitate completion of the curing of said resin.

7. A method of applying paint or varnish to the exterior of elongate elements having two ends and an exterior, the elongate elements being of uniform length, the method comprising the steps of introducing the elongate elements with a predetermined speed horizontally sequentially into a receptacle containing paint or varnish, causing the elongate elements to leave the receptacle at a speed greater than the predetermined speed through a washer which permits the elongate elements to leave the receptacle with a coating of paint or varnish on the exterior of each of the elongate elements, and immediately passing the elongate elements through means adapted to illuminate each point on the exterior of each elongate element with ultra violet light, the paint or varnish comprising a resin which has the property that curing of the resin is initiated in response to the application of said ultra-violet light, wherein the illuminating means have a width less than the length of an elongate element.

* * * * *